United States Patent
Gosar et al.

(10) Patent No.: US 10,673,712 B1
(45) Date of Patent: Jun. 2, 2020

(54) PARALLEL ASYNCHRONOUS STACK OPERATIONS

(71) Applicant: Amazon Technologies, Inc., Reno, NV (US)

(72) Inventors: Jaykumar Harish Gosar, Seattle, WA (US); Abhijeet Kumar, Seattle, WA (US); Madhusudan Govindarajan, Seattle, WA (US); Avinash Jaisinghani, Seattle, WA (US); Jeffrey Lloyd Baker, Issaquah, WA (US); Prashant Jayaraman, Bothell, WA (US); Pete Peerapong Janes, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 472 days.

(21) Appl. No.: 14/228,119

(22) Filed: Mar. 27, 2014

(51) Int. Cl.
*H04L 12/24* (2006.01)

(52) U.S. Cl.
CPC .......................... *H04L 41/5096* (2013.01)

(58) Field of Classification Search
None
See application file for complete search history.

(56) References Cited

U.S. PATENT DOCUMENTS

| | | | |
|---|---|---|---|
| 2009/0171496 A1* | 7/2009 | Furukawa | G06F 17/5009 700/131 |
| 2011/0320605 A1* | 12/2011 | Kramer | H04L 41/0843 709/226 |
| 2013/0055247 A1* | 2/2013 | Hiltgen | G06F 8/60 718/1 |
| 2013/0239089 A1* | 9/2013 | Eksten | G06F 8/70 717/120 |
| 2014/0130056 A1* | 5/2014 | Goodman | G06F 9/5044 718/104 |
| 2014/0244667 A1* | 8/2014 | Bararsani | G06F 17/30017 707/751 |
| 2016/0350160 A1* | 12/2016 | Hamway | H04L 41/0806 |

* cited by examiner

*Primary Examiner* — Wynuel S Aquino
(74) *Attorney, Agent, or Firm* — Davis Wright Tremaine LLP

(57) ABSTRACT

Techniques for executing commands associated with system stacks using parallel workflows are described herein. A dependency representation based at least in part on a stack description is created. The stack description describes stack resource instance and dependencies between those resource instances. The dependency representation is then analyzed to determine sub-workflows each of which may be executed in parallel. The sub-workflows may be altered based on one or more runtime interdependencies and the stack command may be executed by performing the sub-workflows in a determined order.

23 Claims, 10 Drawing Sheets

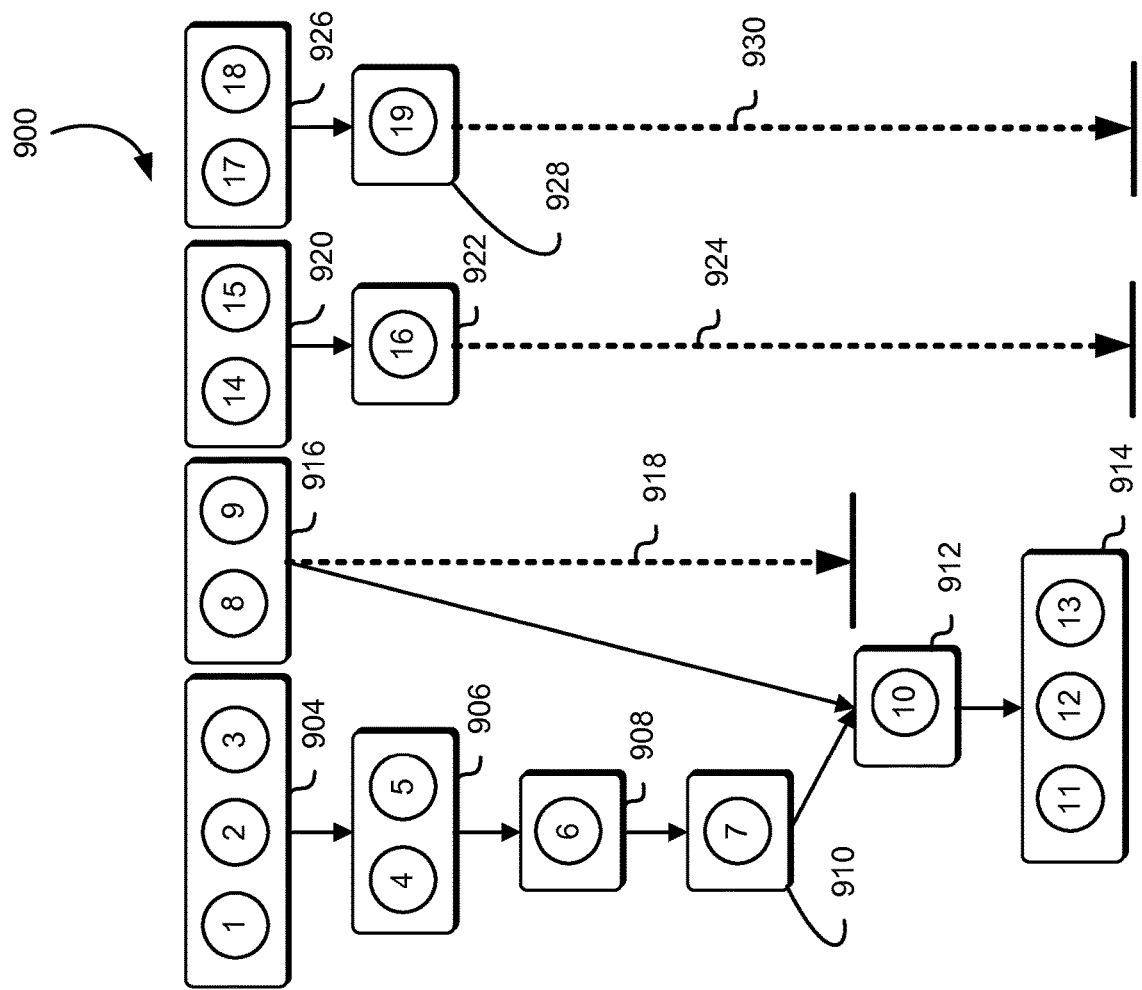
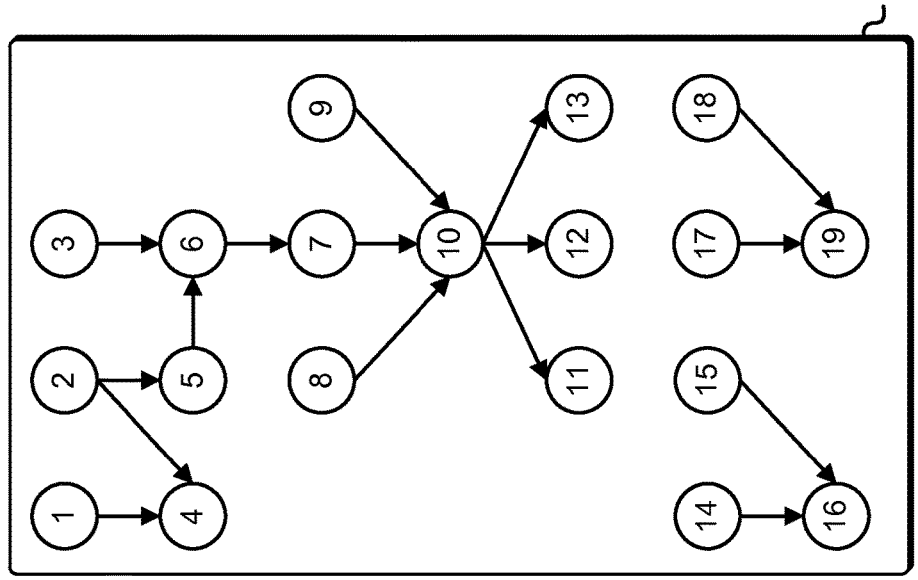
FIG. 9

PARALLEL ASYNCHRONOUS STACK OPERATIONS

BACKGROUND

Modern computing systems place a high importance on cooperative execution and are frequently implemented as a distributed and/or virtualized system comprising a plurality of computer system resources. Such modern computing systems may also exist in a volatile state, with frequent changes to their state. For example, computing systems may be created as required due to, for example, usage demands or to solve a specified problem. Computing systems may also be updated during execution by adding, removing and/or updating the resources. Computing systems may also be destroyed when, for example, they are no longer required or to free up resources associated with the computing system. In many modern computing systems, and especially those that involve virtualized and distributed computing environments, wherein a large plurality of systems work in concert to provide a set of functionality to a large number of users, system changes can take a significant amount of time and use a significant amount of resources due to the interdependent nature of the computing system resources. Creating, updating and/or deleting such computing system resources in a sequential manner may further increase the resource creation bottleneck and may lead to reduced system performance, system outages, system unavailability and a degraded computing system user experience.

BRIEF DESCRIPTION OF THE DRAWINGS

Various embodiments in accordance with the present disclosure will be described with reference to the drawings, in which:

FIG. 9 illustrates an example environment where parallelizable workflows may be ordered in accordance with at least one embodiment.

DETAILED DESCRIPTION

Figure 1:
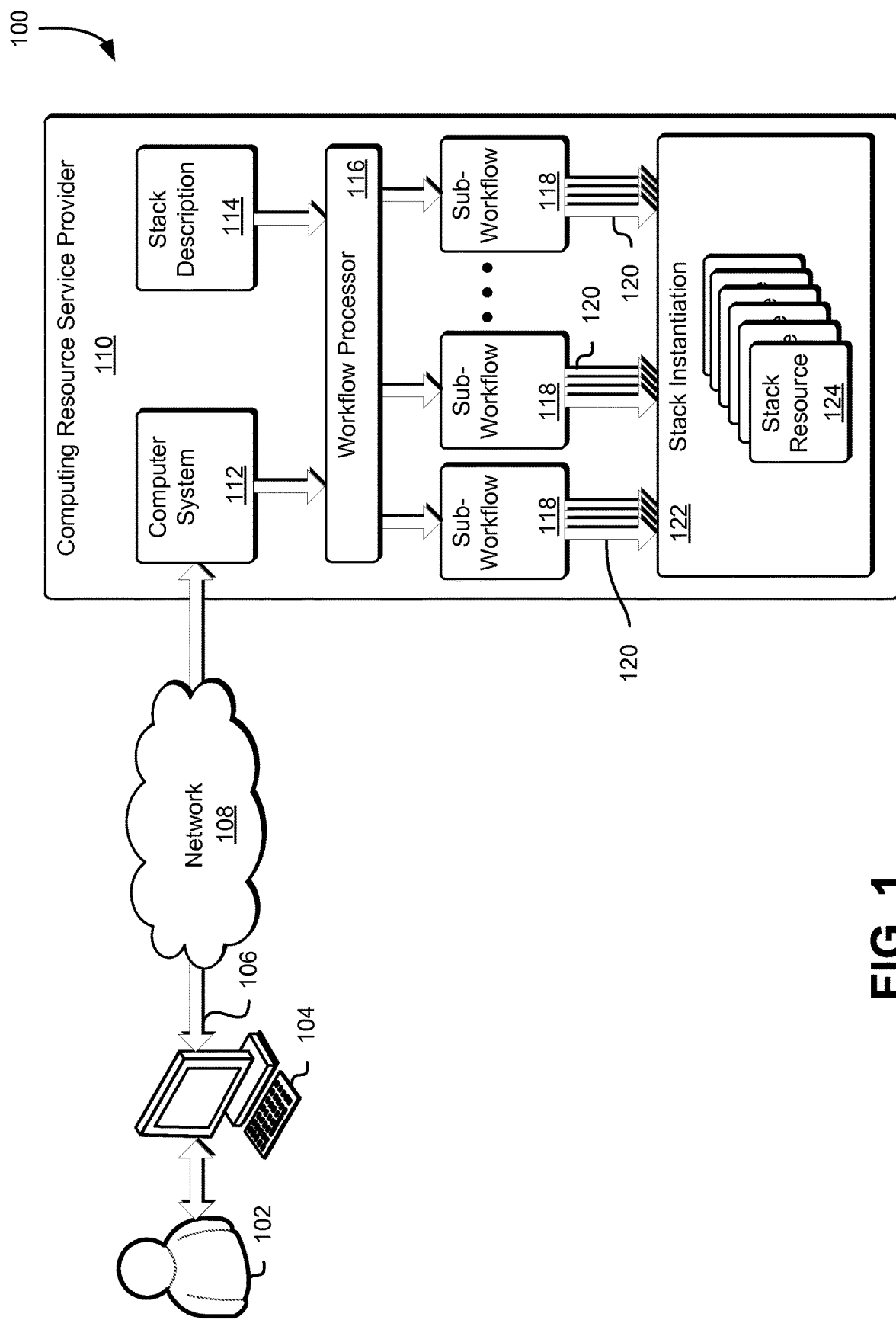
FIG. 1 illustrates an example environment where one or more commands associated with a stack description may be performed in parallel in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems and processes for creating, updating and deleting collections of computing system resources within a distributed and/or virtualized computing system environment and executable code operating thereon. In particular, techniques are disclosed for utilizing computing system capabilities to enable parallelized and/or asynchronous creation, updating, deletion and/or other such operations in association with resources and/or components of computing systems. Such computing systems may include, but not be limited to, computing systems that consist of distributed sets of a plurality of components, subsystems and resources and may further include, but not be limited to, virtualized and/or non-virtualized components, subsystems and resources.

In such distributed and/or virtualized systems, the plurality of components, subsystems and/or computer resources (referred to herein simply as "resources" or "resource instances") may consist of a collection of one or more instances of a number of different types and configurations of resources. Such resources may include, but not be limited to, load balancers, scaling groups, computing systems, database systems, database storage, block storage systems, block storage, data domains, system properties and/or other such computer system resources. In some embodiments, the resource elements associated with the computing system may be provided in a description of the set of resource instances. This description (referred to herein as a "stack") may include information such as the type, number, configuration, metadata and/or other such information describing the associated resource instances (the implementation of a stack may be referred to herein as a "stack instantiation").

A stack may be described using one or more templates, which may include lists of resources and parameters associated with those resources such as the required number and types of resource instances, the resource instances and parameters including systems, system parameters, system configurations, software, hardware, virtual machines, storage, network resources and/or other such resources that may be used by the stack instantiation. The creation, updating, deletion and/or other such operations in association with a stack instantiation, various embodiments, require execution of operations on some or all of these resources and may, in some situations, take an extensive amount of time to complete. During such operations, the resource instances as well as the overall stack instantiation may be partially and/or wholly unavailable to users of a computing system. This unavailability may be compounded in situations where the operation takes considerable time, has a complex order of operations, has undesirable results and must be reversed or other such complications. For example, a stack update operation may include applying the same software update to fifty identical virtual machine instances. If, upon completion of the software updates to the first of these virtual machine instances, a system operator discovers an error in the software update, the operator may have to wait for the update to complete on each system before fixing the error and then may have to issue an operation to undo the update.

A computing system may receive a command to perform one or more operations associated with a stack description and/or a stack instantiation and the command may be prepared for processing by first creating a dependency representation such as a dependency graph of the resources associated with the stack description and/or the stack instantiation. A dependency graph is a graphical (in the mathematical sense) representation of one or more resources which may be represented as nodes (also referred to herein as "vertices") of the graph and one or more dependencies between those resources which may be represented as directed edges between pairs of nodes. For example, if resource "A" depends on resource "B" and resource "B" depends on resource "C", resource "D" and resource "E", the resulting dependency graph may have five nodes, with a directed edge between the node (also referred to herein as a "vertex") representing resource "A" and the node representing resource "B", a directed edge between the node representing resource "B" and the node representing resource "C", a directed edge between the node representing resource "B" and the node representing resource "D" and a directed edge between the node representing resource "B" and the node representing resource "E".

In some embodiments, a dependency graph may include edge weighting which may be used to represent the strength of a dependency. For example, an edge weighting of zero may represent that, while there is a connection between the associated resources, there is no dependency, an edge weighting of one may represent a strong dependency between the associated resources and an edge weighting between zero and one may represent a partial dependency between the associated resources. In some embodiments, a dependency graph may be processed to combine (or collapse) nodes with no dependencies between them into a single node so that, for example, a dependency graph that includes ten resources that have no dependencies (no edges either entering or leaving the associated nodes) may have those ten nodes collapsed into a single node representing the ten resources. A set of dependencies between resources may be alternatively represented by a dependency representation such as a matrix, a tree such as a spanning tree, a set of one or more functions or some other such mathematical representation that may show relationships between associated objects. As may be contemplated, the types of representations of resources and resource dependencies described herein are illustrative examples and other such types of representations of resources and resource dependencies may be considered as within the scope of the present disclosure.

A command associated with a stack that has been instantiated such as, for example, a create stack command, an update stack command, a cancel update command, a rollback update command or a delete stack command, may create the dependency graph of the resources based at least in part on the stack instantiation and may also create the dependency graph based at least in part on the stack description. The stack command may be received as a transmitted command, or as a command sent to or sent from a web service, or as a command to execute one or more commands from an application programming interface (API) configured to perform stack operations or as a combination of these and/or other such command types. The stack description may be received as a textual description of the resources associated with the stack and/or the dependencies between the resources associated with the stack. The stack description may be received as a template and may be described using a specific template description language or may be described using a markup language such as extensible markup language (XML), a data formatting language such as JavaScript™ object notation (JSON) or some other such template description language.

A service associated with the computing system may begin to create the dependency graph by first processing the stack description or template and/or by examining the stack instantiation to determine the dependencies between the resources associated with the stack. The service associated with the computing system may determine the resources and may also determine the dependencies between the resources using one or more passes through the description, template and/or stack instantiation. For example, the service may first process a template to determine the resources, and then may process the template to determine the resource dependencies and then may traverse the stack instantiation to update and/or otherwise alter the dependencies. In some embodiments, the dependencies may be determined from the description, template and/or the stack instantiation. For example, a VM instance that connects to a data store instance may have a dependency on that data store instance. In some embodiments, the dependencies may be described in the stack description or the stack template or may be described in one or more properties and/or metadata elements associated with the stack implementation. The stack description or the stack template may include explicit and/or implicit identifiers associated with the resources and may also include explicit links between those resources using, for example, descriptors such as "Uses", "References", "Requires", "Get Attribute", "Depends On" and/or other such descriptors. Such descriptors may also, in some embodiments, be used to force dependencies between resources where none may actually exist in order to manage and/or increase the efficiency of the stack instantiation. As may be contemplated, the descriptors illustrated herein are illustrative examples and other such descriptors may be considered as within the scope of the present disclosure.

In some embodiments the dependency graph may be created based at least in part on one or more dependencies between the resources associated with the stack description and/or the stack instantiation. The dependency graph may also be created based at least in part on the received command. The dependency graph may also be created based at least in part on the operations and/or the resources associated with the received command. In a simple example, a computing system may receive a command to instantiate five virtual machine (VM) instances on a host computer system. If none of the VMs (the resources in this stack description) have any dependencies between them, the dependency graph may include five nodes representing the VMs with no edges between them, or may include one node representing the five VMs, or may include five nodes representing the VMs with zero weighted edges between them or may include some other representation of the graph.

In a more complex example, if four of the VMs require a shared property from the fifth VM before creation, it may be necessary to create the fifth VM first, before creating the other four VMs. In such an example, the four VMs may have a dependency on the fifth VM for a creation operation. The dependency graph in this example may include five nodes representing the VMs with edges connecting the four VMs to the fifth VM or may include some other simplified representation such as the collapsed and/or weighted representations described above. The dependency graph for an operation (such as, for example, an update operation) for such a stack instantiation may depend on the nature of the update and/or the nature of the shared property. If the update alters the shared property, the fifth VM may need to be updated first before the other four VMs, yielding a dependency graph functionally equivalent to the creation dependency graph. If the update does not alter the shared property, all five VMs may be updated at the same time, yielding a dependency graph functionally equivalent to the dependency graph described for the first simple example.

More complex examples may yield more complex dependency graphs. Such dependency graphs may include, but may not be limited to, dependency graphs with multiple dependencies, dependency graphs with a plurality of independent subgraphs, dependency graphs where delete operation graphs are inverses of the corresponding create operation graphs, dependency graphs where delete operation graphs bear little functional relationship to the corresponding create operation graphs, dependency graphs with collapsed nodes, dependency graphs with weighted edges or combinations of these and/or other such dependency graph topologies. As may be contemplated, the examples of stack descriptions, stack instantiations, stack operations, stack resources and/or other such stack elements as well as the examples of the dependency graphs which may result from such stack elements described herein are illustrative examples and other such stack elements and/or resulting dependency graphs may be considered as within the scope of the present disclosure. As may also be contemplated, the different types of dependency graphs described herein are also illustrative examples and other types of dependency graphs may be considered as within the scope of the present disclosure.

The dependency graph may be used to next determine what operations associated with the received command may be performed in parallel and/or asynchronously. Operations that may be performed in parallel (in contrast to operations that must be performed sequentially) are operations that do not depend on one another and/or operations that may only have small, minor or otherwise insignificant dependencies. When determining the maximum number of operations associated with the received command may be performed in parallel and/or asynchronously, the determination may be based on the availability of downstream worker threads that may be configured to receive and process the operations. In the simple example with the creation of five VM instances with no dependencies between them mentioned above herein, the five instances could be created one-by-one, in any order (sequentially), or the five instances could all be created at the same time (in parallel) or the five instances could be created, for example, in a first group of three in parallel followed by a second group of two in parallel. If, in the simple example, there is also no requirement on when the five VM instances are created, the VM instances may also be created asynchronously such as, for example, creating two VMs followed by creating three VMs. A requirement that the five VMs be created at approximately the same time may introduce the type of dependency that may be considered small, minor or otherwise insignificant in that such a requirement (and the associated dependency) may not preclude executing the commands to create the five VMs in parallel.

The dependency graph may be analyzed to locate one or more dependencies between pairs of resources and these dependencies may be used to partition the dependency graph into one or more sets of workflows (described in detail herein below) where each workflow in a set of workflows may contain one or more operations which may be performed in parallel with other workflows in the set of workflows. The dependencies may then be used to create workflows collecting sets of workflows, some of which may be performed in parallel, and some of which may be performed sequentially. Each set of workflows, the operations of which may be executed in parallel may be referred to herein as a "parallelizable sub-workflow" or a "sub-workflow". For example, a dependency graph that results from a command to create a stack instantiation based on a stack description with a database instance, five VMs that depend on that database instance, a data store instance connected to the first one of the VMs and three other VMs may have a first parallelizable sub-workflow to create the database instance and the data store instance, a second parallelizable sub-workflow to create the five VMs and a third parallelizable sub-workflow to create the three other VMs. The workflow may include first performing the first parallelizable sub-workflow and waiting until it completes before performing the second parallelizable sub-workflow. The third parallelizable sub-workflow may be completed at any time, including before, during or after the first and/or second parallelizable sub-workflow. The parallel execution of parallelizable sub-workflow (executing the third parallelizable sub-workflow while the first and/or the second parallelizable sub-workflows are executing) may depend on the availability of resources within the computing system to perform the operations as well as the availability of resources required by the operations (in this case, available slots in host machines for the VM instances).

In some embodiments, the dependency graph, the contents of the one or more parallelizable sub-workflows, the order of execution of the one or more parallelizable sub-workflows and/or the determination of whether one or more operations within the one or more parallelizable sub-workflows may be executed in parallel may depend on one or more ad-hoc or runtime interdependencies between the resources described in the stack description. The dependency graph, the contents of the one or more parallelizable sub-workflows, the order of execution of the one or more parallelizable sub-workflows and/or the determination of whether one or more operations within the one or more parallelizable sub-workflows may be executed in parallel may also depend on one or more ad-hoc or runtime interdependencies between the resources described in the stack description and other computing system environment resources.

For example, two resources specified in a stack description may not always have a dependency and the dependency graph may be constructed without such a dependency, but at runtime, when parallelizable sub-workflows are being determined, one or more system conditions may introduce a new dependency, referred to herein as an "ad-hoc interdependency" or a "runtime interdependency" between the two resources. Similarly, runtime interdependencies may be introduced based on a determination a dependency between a resource specified in the stack description and one or more downstream computing system environment resources. Downstream computing system environment resources (referred to herein as "downstream resources") may include resources such as virtual machine placer services, block storage allocation services, host machines, network bandwidth and/or other such downstream resources.

Runtime interdependencies may be in addition to the dependencies expressly described in the stack description, implied from the stack description, specified by the customer and/or other such dependencies. These runtime interdependencies may, for example, be a result of operations that may interfere with each other even when the description may not necessarily require such dependencies. For example, a request to instantiate fifty virtual machine (VM) instances at the same may not show any dependencies if none of the fifty VM instances depends on the others. However, there may be a downstream limitation that restricts the size of instantiation groups to, for example, ten VM instances at a time. Such a downstream limitation may introduce runtime interdependencies on the dependency graph. Runtime interdependencies may be introduced during update operations when, for example, an update to a resource "A" requires a similar update to resource "B" to accommodate the changes in resource "A" (changing, for example, file formats or communications protocols or the like).

In some embodiments, runtime interdependencies may alter the order of operations and/or the order of execution of parallelizable sub-workflows based on known sub-workflow strategies that may be stored in a sub-workflow strategy repository. For example, a stack description may specify instantiating resource "A", then resource "B", then resource "C" and then resource "D." A sub-workflow strategy may specify that a resource "E" should be instantiated before a resource "C" and that it is more efficient to instantiate a resource "D" before a resource "A". Based on such a strategy, the order of the sub-workflow may be altered to instantiating resource "D", then resource "A", then resource "B", then resource "E" and then resource "C." As may be contemplated, the type and effect of runtime interdependencies described herein are merely illustrative examples and other such types and effects of runtime interdependencies may be considered as within the scope of the present disclosure.

The order of parallelizable sub-workflows and the method used to instantiate them may depend on system configuration, resource availability and/or other such system concerns. In some embodiments each of the parallelizable sub-workflows may be instantiated in a blocked state which may prevent the parallelizable sub-workflows from executing until the parallelizable sub-workflow is unblocked. In such an embodiment, as a parallelizable sub-workflow completes its execution it may unblock any parallelizable sub-workflows that may be next in the workflow, allowing those parallelizable sub-workflows to execute as resources may become available.

As described herein above, a stack operation may be an operation that may be performed on some or all of the computer resources of a stack implementation according to instructions which may be contained in the operation or may be a separate set of instructions. The operation may include specific instructions to perform the operation on the one or more computer resources of a stack implementation or it may include instructions that may be forwarded to each resource. The stack operation may be initiated by a process, command, system, user and/or other such computer system entity running on a local and/or remote system. The stack operation may be initiated by a trusted user, or by a standard user, or by an autonomous process, or as a result of an alarm or condition or by a combination of these and/or other methods. The stack operation may be verified for integrity and authenticated using various methods, such as by using passwords, or evaluating a public and private cryptographic key, or by verifying it against computer system ownership or policy, or by a combination of these and/or other validation and authentication methods.

Once a stack operation is received by a computing system, one or more commands associated with the stack operation may be processed by one or more systems and/or subsystems of the computing system such as, for example, by dedicated hardware, firmware and/or software components of the computer system. The commands associated with the stack operation (referred to herein simply as "commands") may be processed by a receiving computer system entity. The commands may be relayed by the receiving computer system entity to other computer system entities. The commands may be both processed by a receiving computer system entity and relayed by the receiving computer system entity to other computer system entities. In some embodiments where the commands are relayed by a receiving computer system entity to other computer system entities, those other computer system entities may also either process the command, relay the command to other computer system entities or both process and relay the command to other computer system entities. Implementation of the commands associated with a stack operation, commands to process system states, commands to monitor progress as well as other commands to complete operations may be implemented as part of an existing and/or new application programming interface running on one or more computer resources or computer entities on the computer system.

A computer system entity that processes the commands may verify the applicability of the commands by ensuring that the computer system entity is in a state where the commands may be processed. For example, the processing of commands to perform an update to one or more computer system resources may be allowed in some embodiments if the system is instantiated, but not yet running. In another example, the processing of commands to stop and/or destroy a computing system may be allowed after a creation operation has been completed. In another example, the processing of some commands may be allowed under any circumstances. The policies about when commands and/or operations are allowed may depend on a variety of factors, including, but not limited to, the type and scope of the operation and/or command, the state of the computer system entity, the type of the computer system entity, system reliability concerns, system security concerns, system policies, system availability concerns, business logic, and/or a combination of these and/or other factors. As may be contemplated, the different operations as well as the different operations policies described herein are illustrative examples and other such operations and/or operations policies may be considered as within the scope of the present disclosure.

In some embodiments, the functionality to process commands associated with stack operations may be performed by the implementation and processing of workflows. A workflow may be a set of defined procedures that, when executed or performed in a defined order, accomplish a certain set of system functionality. Workflows may be nested and/or combined. A workflow to destroy a stack instantiation that was created from a stack description may, in some embodiments, be implemented in conjunction with the workflow to create the stack instantiation. One or more operations associated with a workflow may be processed by one or more computer system entities including, for example, a receiving computer system entity. In some embodiments, workflow operations may be relayed by the receiving computer system entity to other computer system entities or may be both processed by a receiving computer system entity and relayed by the receiving computer system entity to other computer system entities. A receiving computer system entity may process some of the workflow operations, forward some of the operations, and both process and forward some of the operations. Where the workflow operations may be relayed by a receiving computer system entity to other computer system entities, those other computer system entities may also process the operations, relay the operations to other computer system entities or do a combination of both.

In some embodiments, a computer system entity that processes operations of a workflow may also be configured to verify the applicability of the commands by ensuring that the computer system entity is in a state where the steps of the workflow may be executed by, for example, comparing one or more measurements of the computer system to one or more policies associated with the workflow operations. The policies about when the processing of operations in workflows may be allowed may be part of the workflow, may be part of a separate policy implementation or may be part of a combination of these and/or other components of the computer system. The policies about when processing of operations in workflows may be allowed may depend on a variety of factors, including, but not limited to, the type and scope of the workflow, the type and scope of the operations and/or commands associated with the workflow, the state of the computer system entity, the type of the computer system entity, system reliability concerns, system security concerns, system policies, system availability concerns, business logic, and/or a combination of these and/or other factors. In some embodiments, the processing of the operations associated with a workflow may result in the computer system entity executing a variety of commands and operations and may also result in the computer system entity passing through one or more internal states while executing those commands or operations. Implementation of the commands to process the workflows and execute workflow operations may be implemented as part of an existing and/or new API running on one or more computer resources or computer entities on the computer system. In some embodiments, executing a workflow may include providing the workflow to another system, process, service, module, application and/or some other such computer system entity and performing one or more operations to cause the other computer system to execute the workflow. In some embodiments, a workflow may be executed by a plurality of such computer system entities working together to complete the execution of the workflow.

A workflow may include a set of commands or operations to create, restore, update, cancel update, rollback update and/or other such operations in association with systems, subsystems, configurations, states, and/or combinations of these and other computer system entities. The set of commands may include subsets of the set of commands that must be performed in a specific order and in sequence, subsets of the set of commands that may be performed in any order but must be performed one at a time, subsets of the set of commands that may be performed in any order and may be performed at any time, and/or a combination of these or other subsets of the set of commands. A workflow may include functionality to perform certain subsets of the set of commands in response to the state of these and/or one or more other computer system entities. A workflow may include functionality to perform certain subsets of the set of commands in response to the results returned from these and/or other commands and/or subsets of commands. A workflow may include functionality to report the status of the update and of individual commands through a variety of methods, including, but not limited to, logs, alarms, alerts, messages, and/or a combination of these and other status reporting methods. A workflow may include functionality to add to, remove from, and/or otherwise make alterations to the set and/or any subsets of the set of commands of the workflow in response to these status reporting methods, or in response to external commands or processes, or in response to autonomous subsystems on this or other computer systems, and/or in a combination of these or other stimuli. The set of commands of a workflow may include, but not be limited to, commands to create, update, destroy and/or other such operations in association with software systems, operating systems, hardware, network resources, virtual machine instances, storage resources, computer resource parameters, resource groups, data formats, data and/or combinations of these and/or other commands.

Various commands associated with the stack operations, including, but not limited to, the storage and retrieval of commands, the storage and retrieval of workflows, the processing of commands or workflows, the reporting of statuses, may in some embodiments, take advantage of restricted, shared, or otherwise specialized hardware, software, firmware or other computer system components. For example, some software systems including, but not limited to, computer operating systems, have software system creation, update and removal functionality incorporated into the computer operating system. In such systems, the workflows may be performed by calling some or all of the functionality of the computer operating system itself. In such examples, the stack operation may be orchestrated by disparate processes and/or components and may utilize generalized components, defined and/or dedicated components such as interfaces, terminals, networks, system hardware, system software, system firmware, or a combination of these or other processes and/or components.

FIG. 1 illustrates an example environment 100 where a computing system, as well as the associated code running thereon, may be used to perform one or more commands associated with a stack description and/or a stack instantiation in parallel or asynchronously. A user 102 may connect 106 to a computer system instance 112 through a computer system client device 104 and may initiate a connection with and/or interaction with one or more services running on the computer system instance 112 or on a computing resource service provider 110. The computer system instance 112 may be operating within a computing resource service provider 110. In some embodiments, the computing resource service provider 110 may provide a distributed, virtualized and/or datacenter environment within which one or more applications, processes, services, virtual machines and/or other such computer system entities may be executed. In some embodiments, the user 102 may be a person, or may be a process running on one or more remote computer systems, or may be some other computer system entity, user or process. The command or commands to connect to the computer system instance may originate from an outside computer system and/or server, or may originate from an entity, user or process on a remote network location, or may originate from an entity, user or process within the computing resource service provider, or may originate from a user of the computer system client device 104, or may originate as a result of an automatic process or may originate as a result of a combination of these and/or other such origin entities. In some embodiments, the command or commands to initiate the connection 106 to the computing resource service provider 110 may be sent to the computer system instance 112, without the intervention of the user 102. The command or commands to initiate the connection 106 to the computer system instance 112 may originate from the same origin as the command or commands to connect to the computing resource service provider 110 or may originate from another computer system and/or server, or may originate from a different entity, user or process on the same or a different remote network location, or may originate from a different entity, user or process within the computing resource service provider, or may originate from a different user of a computer system client device 104, or may originate as a result of a combination of these and/or other such same and/or different entities.

The user 102 may request connection to the computing resource service provider 110 via one or more connections 106 and, in some embodiments, via one or more networks 108 and/or entities associated therewith, such as servers connected to the network, either directly or indirectly. The computer system client device 104 that may request access to the computer system instance 112 may include any device that is capable of connecting with a computer system via a network, including at least servers, laptops, mobile devices such as smartphones or tablets, other smart devices such as smart watches, smart televisions, set-top boxes, video game consoles and other such network enabled smart devices, distributed computing systems and components thereof, abstracted components such as guest computer systems or virtual machines and/or other types of computing devices and/or components. The network may include, for example, a local network, an internal network, a public network such as the Internet, a wide-area network, a wireless network, a mobile network, a satellite network, a distributed computing system with a plurality of network nodes or other such networks. The network may also operate in accordance with various protocols, such as those listed below, Bluetooth, WiFi, cellular network protocols, satellite network protocols and/or others.

The computing resource service provider 110 may provide access to one or more host machines as well as provide access to computer services such as virtual machine (VM) instances, automatic scaling groups, file-based database storage systems, block storage services, redundant data storage services, data archive services, data warehousing services, user access management services, content management services and/or other such computer system services as may be running thereon. The computing resource service provider 110 may also provide access to computer system resources such as user resources, policy resources, network resources and/or storage resources. In some distributed and/or virtualized computer system environments, the resources associated with the computer services may be physical devices, virtual devices, combinations of physical and/or virtual devices or other such device embodiments. In some embodiments, the host machines may be physical machines located within the computer system environment. In some embodiments, the host machines may be guest virtual machines operating on physical machines located within the computer system environment.

The connection 106 may be used to issue one or more commands to perform one or more operations associated with a stack description 114 and/or an existing stack instantiation 122. For example, operations may be issued from the computer system instance 112 to be executed by a workflow processor 116 to create the stack instantiation described in the stack description 114. In such an example, the workflow processor 116 may create one or more sub-workflows 118 (or parallelizable sub-workflows) to create the resources associated with the stack description and may cause those sub-workflows 118 to be executed 120 to create the stack instantiation 122 comprising one or more stack resources 124. The sub-workflows 118 may be executed 120 in parallel, or in sequence or in a combination of in parallel and in sequence according to the dependencies between the sub-workflows. In another example, operations may be sent from the computer system instance 112 to be executed by a workflow processor 116 to delete the stack instantiation 122. The workflow processor 116 may determine the sub-workflows 118 and the execution 120 from the stack description 114, or may determine the sub-workflows 118 and the execution 120 from the stack instantiation 122 or may determine the sub-workflows 118 and the execution 120 from a combination of these and/or other such properties associated with the stack.

Figure 2:
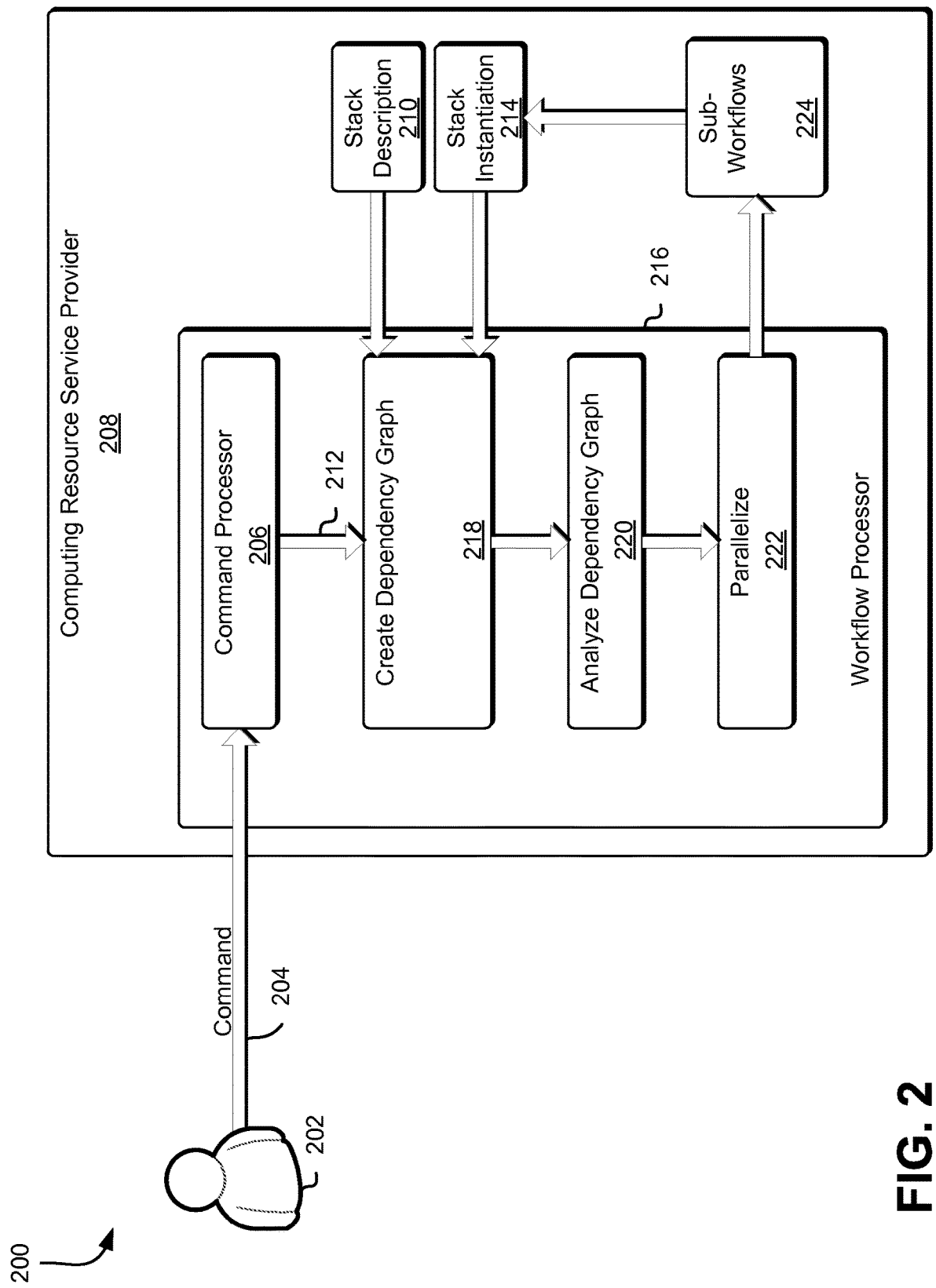
FIG. 2 illustrates an example environment where a workflow processor may process one or more commands in accordance with at least one embodiment.

FIG. 2 illustrates an example environment 200 where a workflow processor may process one or more commands associated with a stack description and/or a stack instantiation for parallel and/or asynchronous execution as described herein at least in connection with FIG. 1 and in accordance with at least one embodiment. A user 202 such as user 102 described herein in connection with FIG. 1 may issue a command 204 to a workflow processor 216 running within a computing resource service provider 208. The command may be received by a command processor 206 which may be configured to receive the command and perform one or more operations in response to the command. The command processor 206 may receive the command and may perform one or more operations 212 to cause one or more processes, services, applications, systems or modules associated with the workflow processor 216 to create a dependency graph 218. The one or more operations 212 to create a dependency graph 218 may be based at least in part on the command 204, and/or may be based at least in part on a stack description 210 and/or may be based at least in part on an existing stack instantiation 214. The workflow processor may then analyze the dependency graph 220 to determine whether one or more operations associated with the command 204 may be partitioned into sub-workflows. If it is determined that one or more operations associated with the command 204 may be partitioned into sub-workflows, the one or more operations may be parallelized 222 into one or more parallelizable sub-workflows 224 which then may be performed on the stack instantiation 214. In some embodiments where the command may be to create the stack instantiation 214, the parallelizable sub-workflows 224 may be used to create the stack instantiation 214 in parallel and/or asynchronously.

Figure 3:
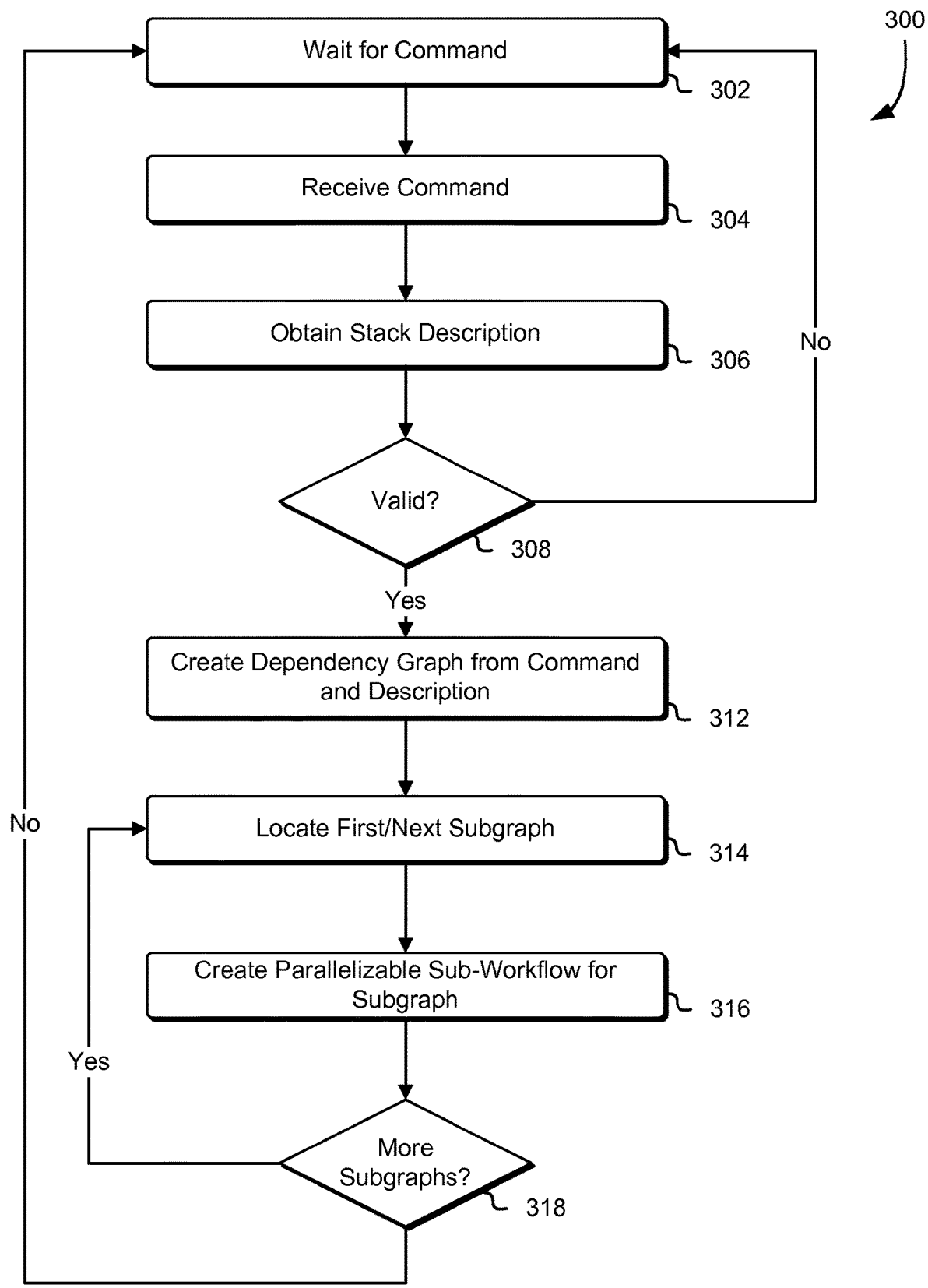
FIG. 3 illustrates an example process for creating parallelizable workflows in accordance with at least one embodiment.

FIG. 3 illustrates an example process 300 for creating parallelizable sub-workflows based at least in part on a received command, a stack description and/or a stack instantiation as described herein at least in connection with FIGS. 1 and 2 and in accordance with at least one embodiment. A workflow processor such as the workflow processor 116 described herein at least in connection with FIG. 1 may perform at least a portion of the process illustrated in FIG. 3. Other entities operating within a computing system may also perform at least a portion of the process illustrated in FIG. 3 including, but not limited to, services, applications, modules, processes, operating system elements, virtual machine elements, network hardware, controlling domains (e.g., a hypervisor) or combinations of these and/or other such entities operating within the computing system.

A command processor such as a command processor 206 described herein in connection with FIG. 2, operating in association with a workflow processor such as a workflow processor 116 described herein in connection with FIG. 1 may wait for a command 302. When a command is received 304, a workflow processor may obtain a stack description 306. The stack description may be obtained as a template and/or description as described herein above. The stack description may also be obtained from a stack instantiation also as described herein above. If the stack description is not valid, the process may return to wait for a command 302. If the stack description is valid 308, the workflow processor may create a dependency graph 312 for the stack. The dependency graph may be based on the stack description, the command and/or a stack instantiation. The nodes of the dependency graph may be based on the resources associated with the stack. The edges of the dependency graph may be based on dependencies between the resources associated with the stack.

The workflow processor may then traverse the dependency graph, using information in the graph to determine appropriate subgraphs of the graph that may be used as the basis for one or more parallelizable sub-workflows. For example, as described herein above, a set of VM instances with no dependencies between them may be used as the basis for a parallelizable sub-workflow to create those VM instances. The workflow processor may first locate a subgraph 314 which may be used as the basis to create a parallelizable sub-workflow and may then create a parallelizable sub-workflow for that subgraph 316. The workflow processor may then continue searching for more subgraphs 318 which may be used as the basis for a parallelizable sub-workflow and creating a parallelizable sub-workflow for that subgraph 316 until the process is complete. In some embodiments, the workflow processor may continue until the entirety of the dependency graph has been partitioned into parallelizable sub-workflows. In some embodiments, the workflow processor may partition only a portion of the dependency graph into parallelizable sub-workflows. In such embodiments, the workflow processor may execute one or more commands to determine when to terminate the process based on, for example, a threshold value being reached, or the availability of resources, or lack of progress in partitioning or a combination of these and/or other such determining factors. In such embodiments, the workflow processor may also perform one or more operations to further process the remaining unprocessed portions of the dependency graph such as, for example, by placing the un-partitioned operations into one or more other workflows.

Figure 4:
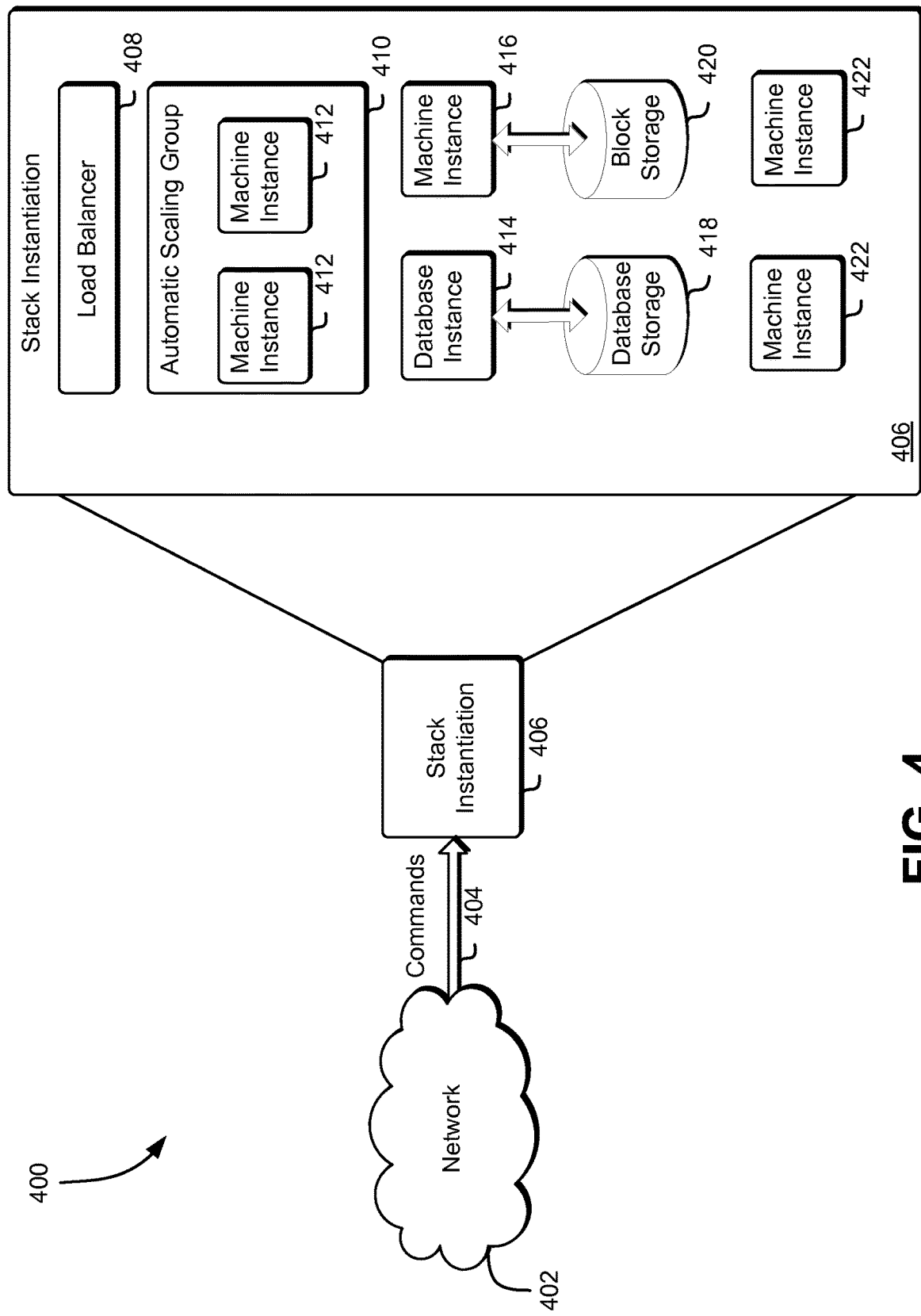
FIG. 4 illustrates an example environment where commands may be sent to a plurality of resources in a stack instantiation in accordance with at least one embodiment.

FIG. 4 illustrates an example environment 400 where commands may be sent to a plurality of computing system environment resources in a stack instantiation as described herein at least in connection with FIG. 1 and in accordance with at least one embodiment. Commands 404 may be received by stack instantiation 406 from network 402 and/or entities associated therewith, such as servers or other computer systems also connected to the network, either directly or indirectly, as described at least in connection with FIG. 1. The stack instantiation 406 may include a variety of computing system environment resources. Examples of computer resources may include, but are not limited to, load balancers 408, automatic scaling groups 410, automatic scaling group machine instances 412, database instances 414 associated with database storage 418, machine instances 416 associated with block storage 420, independent machine instances 422 and/or other such computing system environment resources. The computing system environment resources may be physical resources running directly on computer system hardware, or virtual machines running on shared computer system hardware or a combination of these and/or other resource types. A single stack instantiation may include plurality of such computing system environment resources and some or all of the plurality of such resources may be shared by one or more stack instantiations.

Figure 5:
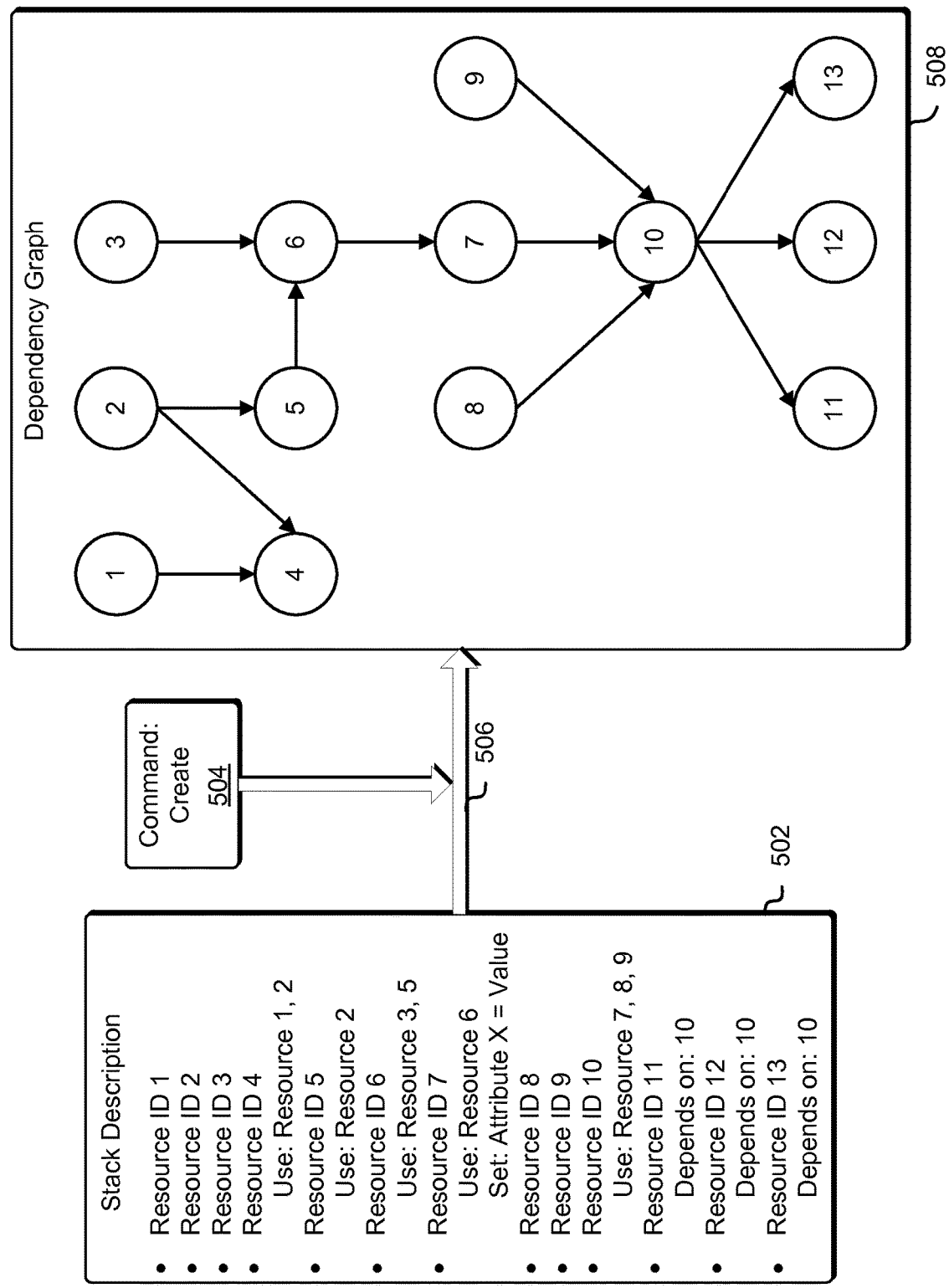
FIG. 5 illustrates an example environment where a dependency graph may be created in accordance with at least one embodiment.
Figure 7:
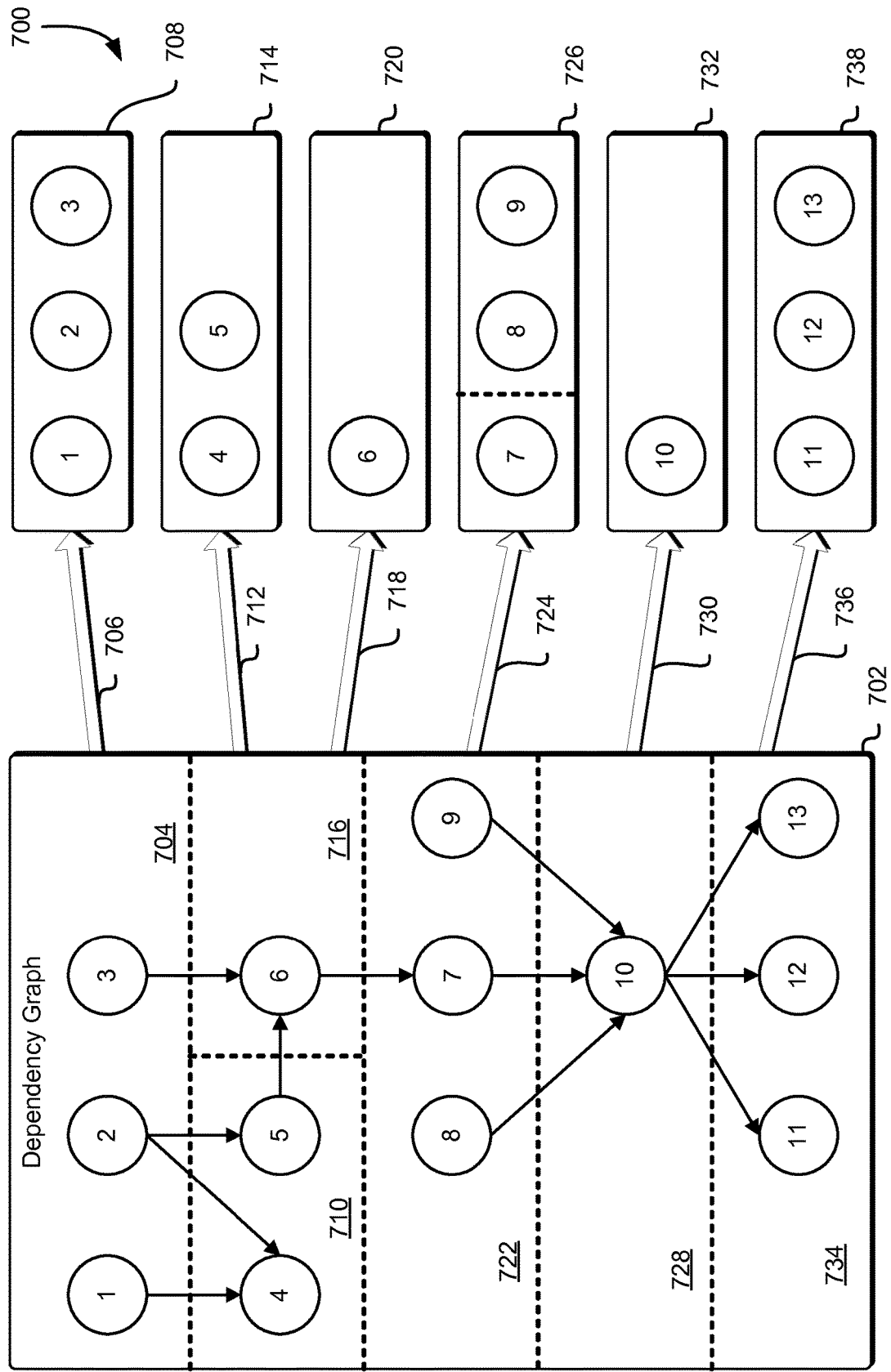
FIG. 7 illustrates an example environment where a dependency graph may be partitioned into one or more parallelizable workflows in accordance with at least one embodiment.

FIG. 5 illustrates an example environment 500 where a dependency graph may be created based at least in part on a stack description and based at least in part on a received command as described herein at least in connection with FIGS. 1 and 2 and in accordance with at least one embodiment. A stack description 502 and a command 504 may be received 506 by a workflow processor such as the workflow processor 116 described herein in connection with FIG. 1. In the example illustrated in FIG. 5, the command 504 is a command to create the stack instantiation corresponding to the stack description 502. The workflow processor may create a dependency graph 508 based on the information in the stack description 502 and on the command 504. In the dependency graph 508, the nodes may be created with identifiers corresponding to the ID of the resource. For example, the resource with ID 1, on the first line of the stack description 502 corresponds to the node labeled "1" in dependency graph 508. In the description of FIGS. 5, 7 and 9, a node corresponding to a resource with a given ID and labeled with that ID may be referred to simply as node "ID" (so, for example, a node corresponding to a resource with ID "1" and labeled as such may be referred to simply as node "1").

In FIG. 5, node "1" through node "13" in dependency graph 508 may correspond to the resources with ID 1 through ID 13. The dependency that resource ID 4 has on resource ID 1 is illustrated with the directed edge between node "1" and node "4" and the dependency that resource ID 4 has on resource ID 2 is illustrated with the directed edge between node "2" and node "4". The directed edge between node "1" and node "4" and the directed edge between node "2" and node "4" indicate that resource ID 1 and resource ID 2 must be created before resource ID 4 may be created. Similarly, resource ID 2 must be created before resource ID 5 may be created (dependency between node "2" and node "5"), resource ID 3 and resource ID 5 must be created before resource ID 6 may be created, resource ID 6 must be created before resource ID 7 may be created and so on. The dependencies represented by the edges between nodes in the dependency graph 508 correspond to the dependencies in the stack description 502. Nodes with incoming edges (node "4", node "5", node "6", node "7", node "10", node "11", node "12" and node "13" in the example illustrated in FIG. 5) represent resources that may be dependent on one or more other resources. Nodes without incoming edges (node "1", node "2", node "3", node "8" and node "9" in the example illustrated in FIG. 5) represent resources that may not be dependent on other resources.

Figure 6:
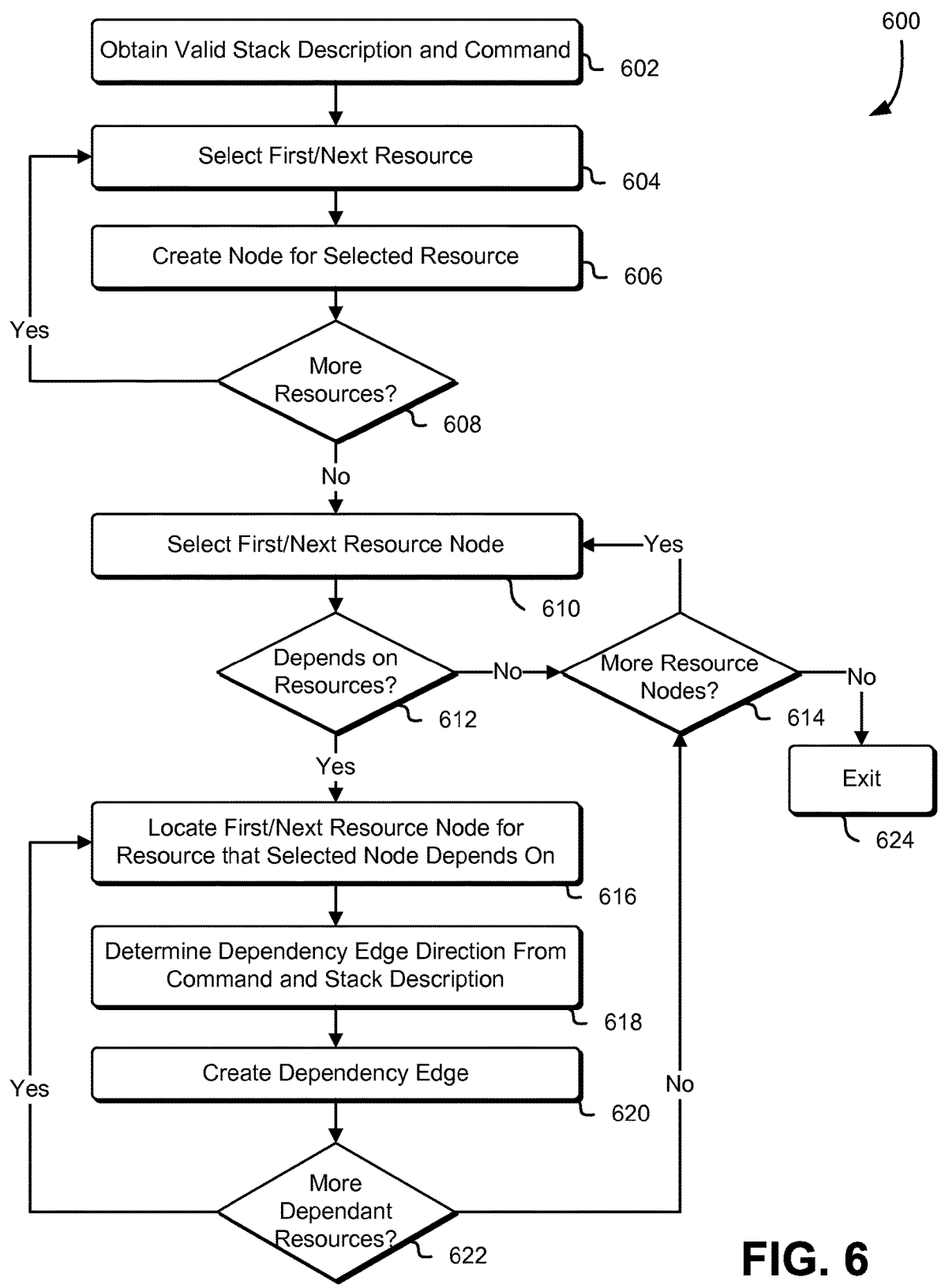
FIG. 6 illustrates an example process for creating a dependency graph in accordance with at least one embodiment.

FIG. 6 illustrates an example process 600 for creating a dependency graph based at least in part on a stack description and a command as described herein at least in connection with FIGS. 1 and 2 and in accordance with at least one embodiment. A workflow processor such as the workflow processor 116 described herein at least in connection with FIG. 1 may perform at least a portion of the process illustrated in FIG. 6. Other entities operating within a computing system may also perform at least a portion of the process illustrated in FIG. 6 including, but not limited to, services, applications, modules, processes, operating system elements, virtual machine elements, network hardware, controlling domains (e.g., a hypervisor) or combinations of these and/or other such entities operating within the computing system.

A workflow processor may obtain a valid stack description and command 602. The workflow processor may begin selecting resources 604 and creating nodes for the selected resource 606 until all resource nodes have been created 608. The workflow processor may then select the first resource node 610 and, based on the stack description and/or based on an existing stack instantiation, may determine whether the selected resource node depends on any of the other resources 612. If the selected resource node depends on any of the other resources 612, the workflow processor may locate the resource node that corresponds to the resource that the selected resource may depend on 616. The workflow processor may then determine the direction of the dependency edge 618 between the selected resource and the resource node that corresponds to the resource that the selected resource may depend on based at least in part on the command, the stack description and/or the stack instantiation.

For example, for a command to create a stack instantiation, if there is a resource "A" that may depend on a resource "B", then resource "B" may be required to be created before resource "A". In such an example, the dependency edge may be drawn from resource "B" to resource "A" indicating that the creation resource "A" may depend on the creation of resource "B" as described herein at least in connection with FIG. 5 and in accordance with at least one embodiment. By contrast, for a command to delete a stack instantiation with the same relationship between resource "A" and resource "B", the dependency graph may be drawn from resource "A" to resource "B" indicating that the deletion of resource "B" may depend on the deletion of resource "A". In some embodiments a different dependency graph, with different edge directions may be created based on the stack description, the command and/or the stack instantiation. As may be contemplated, the methods of determining edge directions described herein are illustrative examples and other such methods of determining edge directions may be considered as within the scope of the present disclosure.

Upon determining the direction of the dependency edge 618 between the selected resource and the resource node that corresponds to the resource that the selected resource may depend on, the workflow processor may create a dependency edge 620. The workflow processor may then continue looking for more dependent resources 622 of the selected resource and may then repeat the process for additional resource nodes 614 until all resource nodes have been processed. The workflow processor may then exit 624 the process and present the dependency graph for further processing as described herein at least in connection with FIG. 2 and in accordance with at least one embodiment.

FIG. 7 illustrates an example environment 700 where a dependency graph may be partitioned into one or more parallelizable sub-workflows as described herein at least in connection with FIGS. 1 and 2 and in accordance with at least one embodiment. A dependency graph may be created by a workflow processor using the process 600 described herein in connection with FIG. 6. The dependency graph 702 which is the same as the dependency graph 508 described herein in connection with FIG. 5 may be partitioned based at least in part on the dependencies of the graph. In the example illustrated in FIG. 7, node "1", node "2" and node "3" have no incoming edges and thus no dependencies. The three nodes may be partitioned 704 and placed 706 in parallelizable sub-workflow 708. Similarly node "4" and node "5" which depend on node "1" and on node "2" may be partitioned 710 and placed 712 in parallelizable sub-workflow 714. The partition 710 may be created based at least in part on node "6" having a dependency on node "5". Node "6" which depends on node "3" and on node "5" may be partitioned 716 and placed 718 in parallelizable sub-workflow 720. The single resource represented by the single node "6" in parallelizable sub-workflow 720 may be an indicator of the restriction or bottleneck associated with the dependency between node "6" and node "7". Each of the workflow elements prior to the creation of node "6" must be created before node "6" may be created and none of the workflow elements after the creation of node "6" (with the possible exception of node "8" and node "9" described below) may be created until node "6" has been created.

Node "7", node "8" and node "9" may be partitioned 722 and placed 724 in parallelizable sub-workflow 726. Because node "8" and node "9" do not have any incoming edges, node "8" and node "9" may be created before node "7" and may, in fact, be created with parallelizable sub-workflow 720, with parallelizable sub-workflow 714 or with parallelizable sub-workflow 708. Node "10" may be partitioned 728 and placed 730 in parallelizable sub-workflow 732 and node "11", node "12" and node "13" may be partitioned 734 and placed 736 in parallelizable sub-workflow 738, completing the partition of the graph into parallelizable sub-workflow. It should be noted that the partition method illustrated herein in connection with FIG. 7 (and further described herein in connection with FIG. 8) is only one possible partition method. For example, node "1" and node "2" may be partitioned together, node "3", node "4" and node "5" partitioned together and, as mentioned above, node "8" and node "9" may be partitioned with any of the workflows prior to workflow 732. In some embodiments, a partition may be discoverable by the workflow processor, or may be preconfigured based on the description, a template and/or the command. A partition may also be altered and/or optimized to improve instantiation of the stack, to discover critical paths with respect to the stack instantiation and/or to eliminate bottlenecks in the stack instantiation, thus further improving the efficiency of the instantiation. As may be contemplated, the partition method illustrated herein is an example partition method and other partition methods and/or techniques may be considered as within the scope of the present disclosure.

Figure 8:
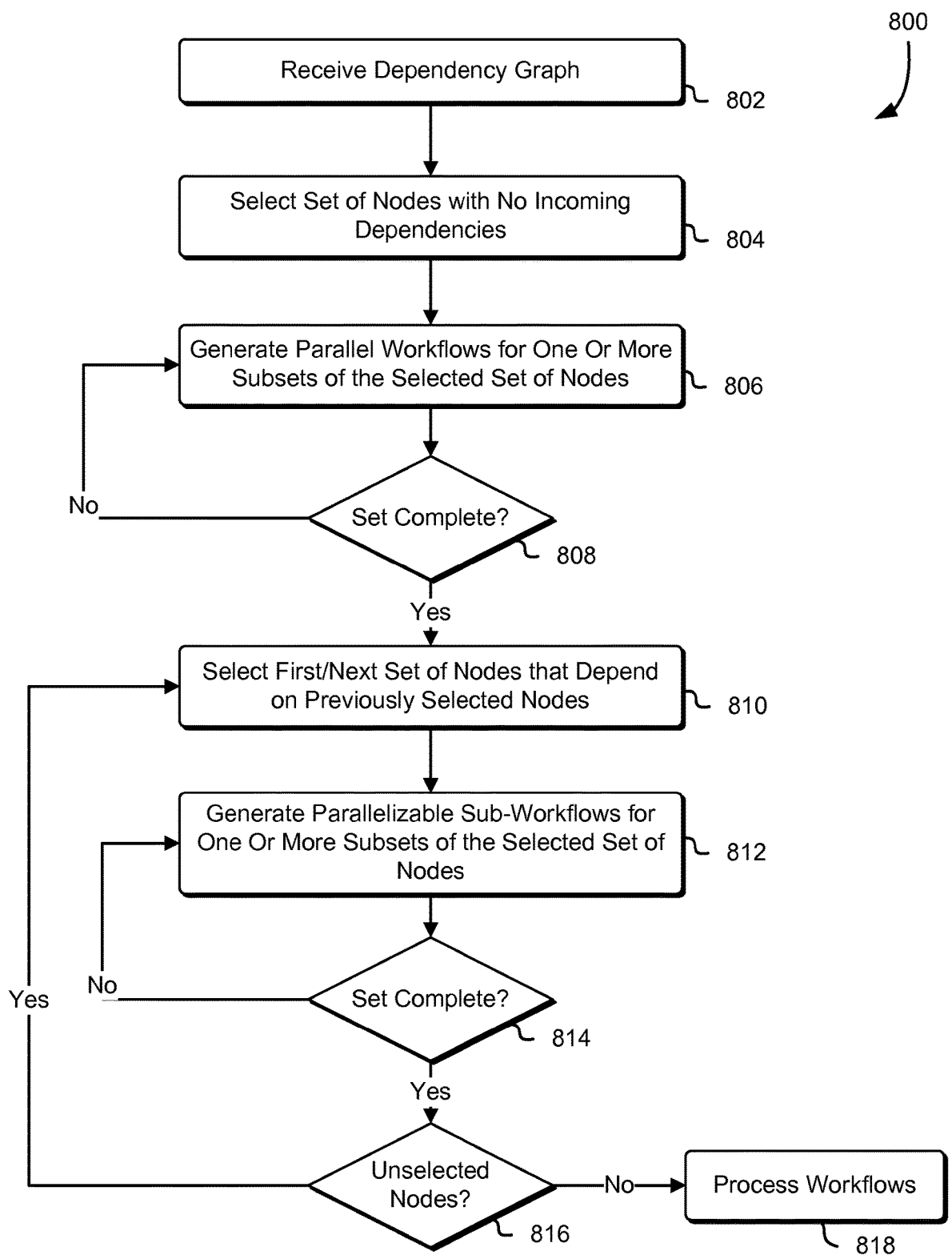
FIG. 8 illustrates an example process for partitioning a dependency graph and generating parallelizable workflows in accordance with at least one embodiment.

FIG. 8 illustrates an example process 800 for partitioning a dependency graph and using the partition to generate one or more parallelizable sub-workflows as described herein at least in connection with FIGS. 1 and 2 and in accordance with at least one embodiment. A workflow processor such as the workflow processor 116 described herein at least in connection with FIG. 1 may perform at least a portion of the process illustrated in FIG. 8. Other entities operating within a computing system may also perform at least a portion of the process illustrated in FIG. 8 including, but not limited to, services, applications, modules, processes, operating system elements, virtual machine elements, network hardware, controlling domains (e.g., a hypervisor) or combinations of these and/or other such entities operating within the computing system.

A workflow processor such as the workflow processor 116 described herein in connection with FIG. 1 may receive a dependency graph 802. The workflow processor may then first select a set of one or more nodes with no incoming dependencies 804 and may generate parallelizable sub-workflows for one or more subsets of the set of one or more nodes with no incoming dependencies 806 until the process of creating parallelizable sub-workflows for the set of nodes with no incoming dependencies is complete 808. The workflow processor may then begin selecting sets of nodes that depend on one or more previously selected nodes with previously created parallelizable sub-workflows 810 and may then generate parallelizable sub-workflows for subsets of these selected sets of nodes 812 until the process of creating parallelizable sub-workflows for that set of nodes is complete 814. The workflow processor may then continue selecting nodes and generating parallelizable sub-workflows until there are no more unselected nodes 816. In some embodiments, the workflow processor may then process the parallelizable sub-workflows 818 to, for example, balance resource processing based on the availability of system resources.

FIG. 9 illustrates an example environment 900 where parallelizable sub-workflows may be ordered and/or parallelized based at least in part on a dependency graph as described herein at least in connection with FIGS. 1 and 2 and in accordance with at least one embodiment. The dependency graph 902 illustrated in FIG. 9 contains three subgraphs. The subgraph with nodes "1" through "13" is the same as the dependency graph 508 illustrated in FIG. 5. The subgraph with nodes "14" through "16" and the subgraph with nodes "17" through "20" have been added for the purposes of this illustration. Parallelizable sub-workflow 904, parallelizable sub-workflow 906, parallelizable sub-workflow 908, parallelizable sub-workflow 910, parallelizable sub-workflow 912 and parallelizable sub-workflow 914 represent a single chain of parallelizable sub-workflow dependencies. Each of the workflows in the chain of parallelizable sub-workflow dependencies must be completed before the next is started. For example, parallelizable sub-workflow 910 may not be started before parallelizable sub-workflow 908 is completed due to the dependency between resource ID 6 and resource ID 7.

In the example illustrated in FIG. 9, parallelizable sub-workflow 916 must be completed before parallelizable sub-workflow 912 due to the dependency between resource ID 8 and resource ID 10, and due to the dependency between resource ID 9 and resource ID 10, but parallelizable sub-workflow 916 may be started at any time due to the lack of dependencies on resource ID 8 and resource ID 9, which is represented by the time line 918. Similarly, parallelizable sub-workflow 920 may be started at any time followed by parallelizable sub-workflow 922 as represented by time line 924 and parallelizable sub-workflow 926 may be started at any time followed by parallelizable sub-workflow 928 as represented by time line 930. The time lines associated with parallelizable sub-workflow 916, parallelizable sub-workflow 920, parallelizable sub-workflow 922, parallelizable sub-workflow 926 and parallelizable sub-workflow 928 represent the ability for a workflow processor to execute those parallelizable sub-workflows in parallel with other parallelizable sub-workflows in systems with sufficient resources to support such parallel execution of parallelizable sub-workflows. For example, parallelizable sub-workflow 916 may be executed in parallel with parallelizable sub-workflow 908 in a system with sufficient resources to support the operations associated with those workflows. As may be contemplated, the methods for ordering the execution of parallelizable sub-workflows described herein are illustrative examples and other methods and/or techniques of ordering the execution of parallelizable sub-workflows may be considered as within the scope of the present disclosure.

Figure 10:
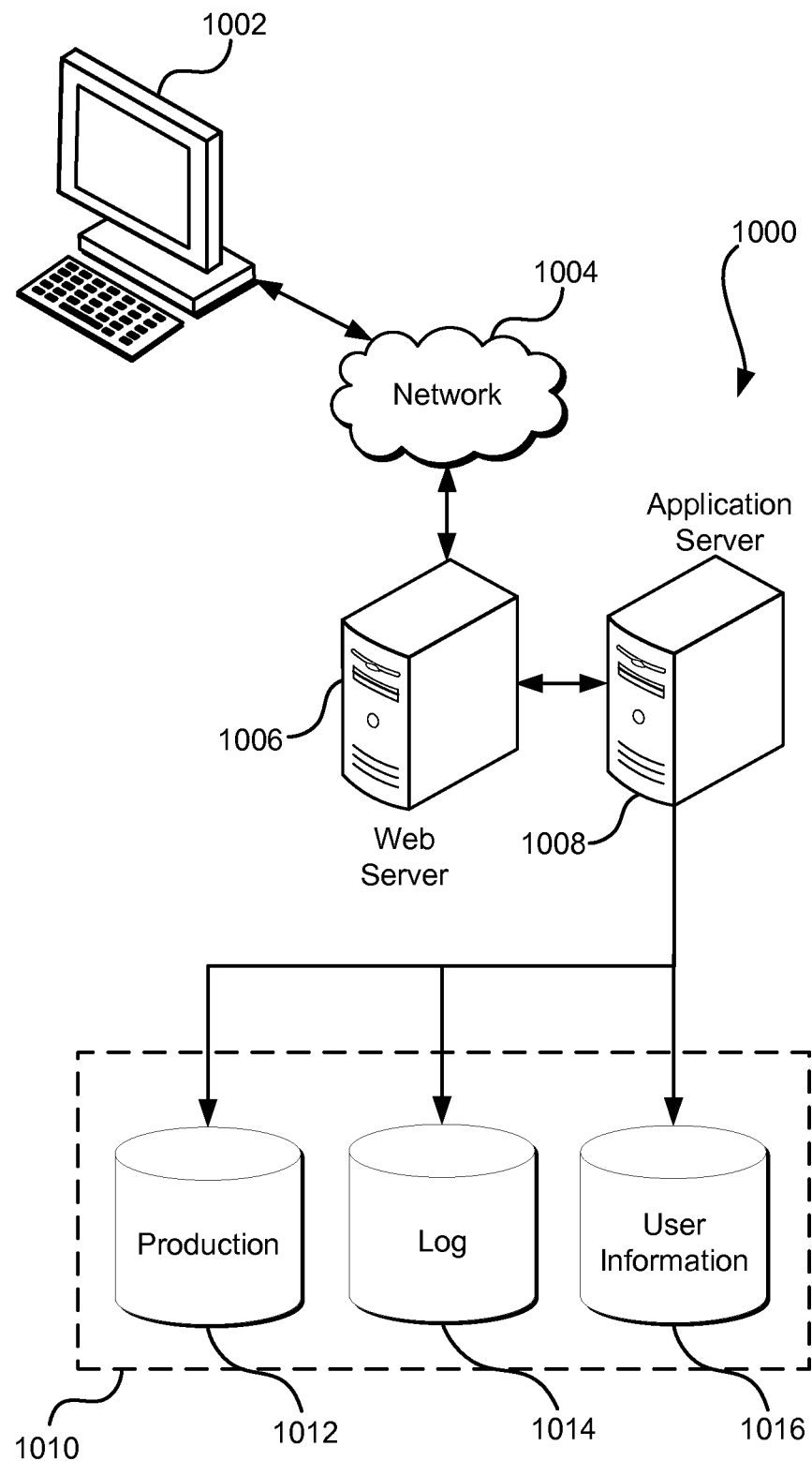
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, in association with a command, a description specifying a plurality of computing resources and a plurality of dependencies between respective resource instances of the plurality of resource instances;
   generating, based at least in part on the description, a graph comprising a plurality of vertices and a plurality of edges corresponding to the plurality of computing resources and the plurality of dependencies, respectively;
   processing, based at least on weights associated with respective edges of the plurality of edges, the graph to:
   remove a subset of the plurality of edges from the graph, the weights corresponding to strengths associated with respective dependencies of the plurality of dependencies; and
   combine, based at least in part on the removing of the subset of the plurality of edges from the graph, a first vertex of the plurality of vertices with a second vertex of the plurality of vertices to generate a third vertex, wherein the third vertex corresponds to two or more computing resources of the plurality of computing resources that are usable to execute at least a portion of a plurality of operations in parallel;
   determining, based at least in part on the processed graph, a workflow comprising the plurality of operations for the plurality of computing resources in connection with the command;
   processing the workflow to determine, based at least in part on the processed graph, an order in which to execute the plurality of operations, the order determined prior to execution of the plurality of operations based at least in part on one or more runtime interdependencies; and
   executing the plurality of operations in the order.

2. The computer-implemented method of claim 1, wherein the one or more runtime interdependencies including at least one of: runtime interdependencies between pairs of resources specified in the description, runtime interdependencies between resources specified in the description and other resources, or runtime interdependencies between resource specified in the description and computing system environment resources.

3. The computer-implemented method of claim 1, wherein the command includes at least one of: stack creation, stack deletion, stack update, cancel stack update, or rollback stack update.

4. The computer-implemented method of claim 1, further comprising:
   analyzing the graph to determine one or more execution bottlenecks within the workflow; and
   performing one or more additional operations to mitigate at least a subset of the one or more execution bottlenecks within the workflow.

5. A system, comprising at least one computing device, comprising at least one processor, that implements one or more services, wherein the one or more services:
   generate, in association with a command, a representation of a plurality of resources and a plurality of dependencies between respective resources of the plurality of resources;
   process the representation to combine, based at least in part on strengths associated with the plurality of dependencies, a first resource of the plurality of resources in the representation with a second resource of the plurality of resources in the representation to generate a third resource of the plurality of resources in the representation, wherein the third resource corresponds to two or more resources of the plurality of resources that are usable to execute at least a portion of a plurality of operations in parallel;
   determine, based at least in part on the processed representation, the plurality of operations for the plurality of resources;
   process the plurality of operations separately from performance of the plurality of operations, the processed representation, and one or more runtime interdependencies to determine an order in which to perform the plurality of operations; and
   perform, in the order, the plurality of operations.

6. The system of claim 5, wherein the representation is a dependency graph representation comprising a plurality of vertices and a plurality of edges wherein each vertex of the plurality of vertices represents a portion of the plurality of resources and at least a subset of the plurality of edges between vertices represents a portion of the plurality of dependencies between the first resource represented by a first pair of vertices and the second resource represented by a second pair of vertices.

7. The system of claim 5, wherein the order includes parallel execution of at least some operations of the plurality of operations.

8. The system of claim 5, wherein the plurality of resources include one or more virtual machine instances configured with one or more applications, the one or more applications configured to provide one or more distributed computer system services.

9. The system of claim 5, wherein the order is based at least in part on the command.

10. The system of claim 5, wherein the command is a web service request.

11. The system of claim 5, wherein the plurality of operations are based at least in part on the command.

12. The system of claim 5, wherein at least one service of the one or more services:
   analyzes the representation; and
   determines one or more execution bottlenecks associated with the plurality of operations.

13. The system of claim 5, wherein the one or more runtime interdependencies include one or more dependencies between a portion of the plurality of resources and one or more computing system environment resources.

14. The system of claim 5, wherein the one or more runtime interdependencies include a runtime interdependency between the first resource of the plurality of resources and the second resource of the plurality of resources.

15. A non-transitory computer-readable storage medium comprising executable instructions that, as a result of being executed by one or more processors of a computer system, cause the computer system to at least:

obtain a representation of a plurality of resources and a plurality of dependencies associated with the plurality of resources;

process the representation to combine, based at least in part on strengths associated with the plurality of dependencies, a first resource of the plurality of resources in the representation with a second resource of the plurality of resources in the representation to generate a third resource of the plurality of resources in the representation, wherein the third resource corresponds to two or more resources of the plurality of resources that are usable to execute at least a portion of a plurality of operations in parallel;

determine, based at least in part on the representation and a command associated with the plurality of resources, the plurality of operations for the plurality of resources;

process, prior to performance of the plurality of operations, the plurality of operations and the processed representation to determine an order in which to perform the plurality of operations, wherein one or more runtime interdependencies associated with at least a portion of the plurality of operations affect the order; and execute the command by performing the plurality of operations in the order.

16. The non-transitory computer-readable storage medium of claim 15, wherein the representation is a dependency graph representation comprising a plurality of vertices and a plurality of edges wherein each vertex of the plurality of vertices represents at least one resource of the plurality of resources, and each edge of at least a subset of the plurality of edges between pairs of vertices represents at least one dependency of the plurality of dependencies between the first resource represented by a first of the pair of vertices and the second resource represented by a second of the pair of vertices.

17. The non-transitory computer-readable storage medium of claim 15, wherein the instructions that cause the computer system to execute the command by performing the plurality of operations further include instructions that cause the computer system to execute at least some of the plurality of operations in parallel.

18. The non-transitory computer-readable storage medium of claim 15, wherein the plurality of resources includes at least one of: virtual machines, load balancers, scaling groups, databases, or block storage.

19. The non-transitory computer-readable storage medium of claim 15, wherein the order is based at least in part on the command.

20. The non-transitory computer-readable storage medium of claim 15, wherein the instructions further include instructions that cause the computer system to:

allow a user of the computer system to configure at least one operation of the plurality of operations; and allow the user of the computer system to configure at least one parameter associated with the order.

21. The non-transitory computer-readable storage medium of claim 15, wherein at least some of the plurality of operations are predetermined by the computer system based at least in part on one or more templates stored in a template repository.

22. The non-transitory computer-readable storage medium of claim 15, wherein the instructions that cause the computer system to process the plurality of operations further include instructions that cause the computer system to determine the order based at least in part on one or more strategies stored in a repository.

23. The non-transitory computer-readable storage medium of claim 15, wherein the command is obtained via an application programming interface.

\* \* \* \* \*